Patented Apr. 21, 1925.

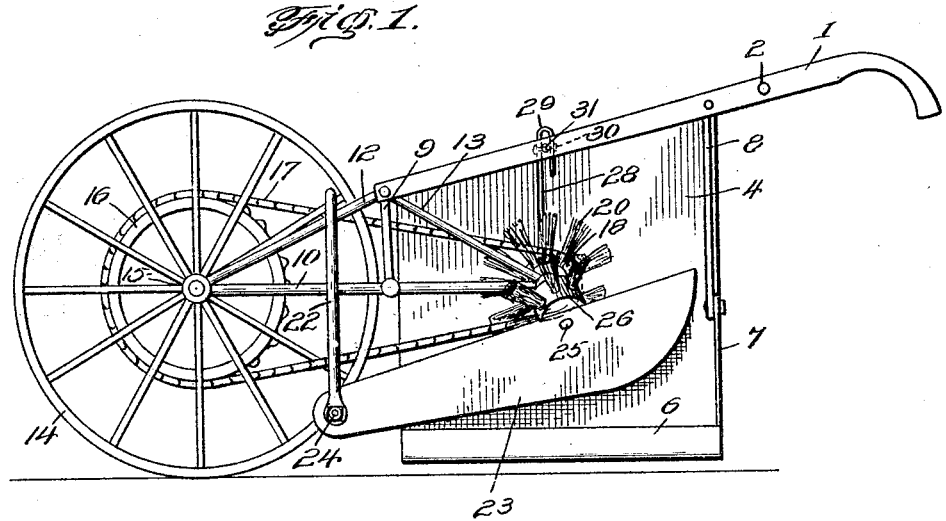
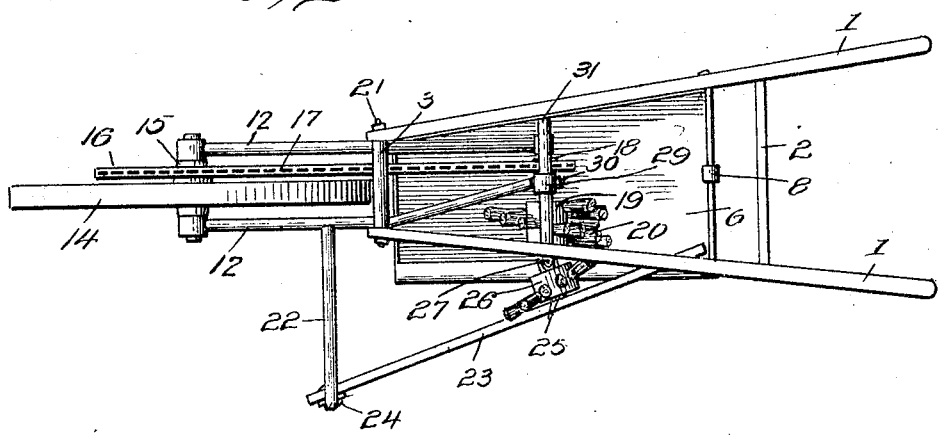

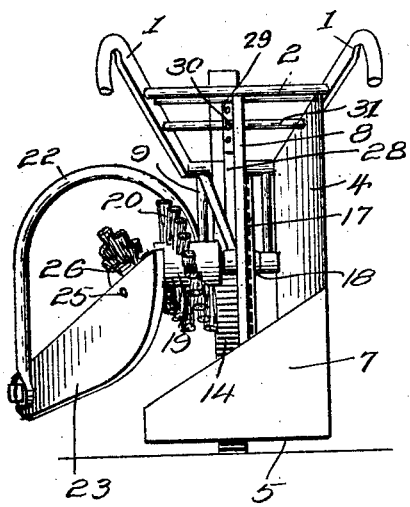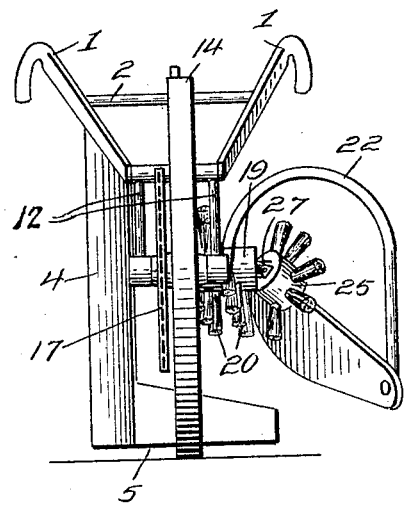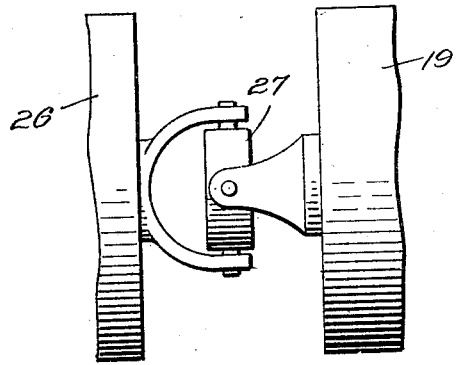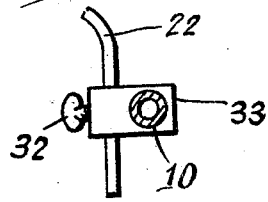

1,534,219

UNITED STATES PATENT OFFICE.

RHESA F. KENNEDY, OF HATTIESBURG, MISSISSIPPI.

BOLL-WEEVIL EXTERMINATOR.

Application filed October 6, 1923. Serial No. 666,943.

*To all whom it may concern:*

Be it known that I, RHESA F. KENNEDY, a citizen of the United States, residing at Hattiesburg, in the county of Forrest and State of Mississippi, have invented certain new and useful Improvements in Boll-Weevil Exterminators, of which the following is a specification.

My invention relates to machines for destroying the cotton boll weevil, and in particular to a wheeled instrument adapted to be propelled by hand along the line of cotton stalks for accomplishing this result.

The objects of the invention are: to provide a machine of this character in which means are provided to engage cotton stalks to guide the plant under an agitator disposed above a receiving trough; to provide a machine of this character equipped with a novel and improved form of agitator, so constructed and arranged as to draw the cotton plant acted upon over a receiving trough; to provide a hand propelled machine of this character having rotatable agitating members and means for gently keeping a cotton plant under the agitating members With these general objects in view and such others as will be apparent from the description, the invention resides in the novel construction, combination and arrangement of parts hereinafter described and claimed, and illustrated in the accompanying drawings, of which—

Figure 1 is a side elevation of the machine constructed in accordance with the invention;

Fig. 2, a top plan view thereof;

Fig. 3, a rear elevation;

Fig. 4, a front elevation; and

Fig. 5, a detail illustrating the connection between the two brush members employed.

Fig. 6, a detail illustrating the guide support mounting.

The details of the invention comprise a pair of handles 1, disposed in converging relation and connected by a cross bar 2, and an end bar 3. Rigidly secured to one of the handle bars 1 is a depending plate 4 bent laterally at the bottom as at 5 to provide a trough section. The rear end of the trough 6 is closed by an upstanding plate 7 integral with the plate 4 and is braced in relation to the handles by means of a brace member 8 connected from the plate 7 to the cross bar 2.

The bottom 5 of the trough 6 is disposed in a horizontal plane and the adjustment of the various parts of the machine is such that under normal conditions it will slightly clear the ground over which the machine is to travel.

The forward end of the handles 1 is in pivotal connection by means of the cross bar 3 with uprights 9 of a frame comprising laterally spaced longitudinal side bars 10, and inclined brace bars 12 and 13. The upright bars 9 are secured at their lower ends to the longitudinal side bars 10 and between the forward ends of the side bars 10 is journaled a relatively large bearing wheel 14 carrying on its hub 15 a sprocket wheel 16 in connection, by means of a chain 17, with a smaller sprocket 18 arranged on the shaft of a rotary brush 19 journaled in the rear ends of the longitudinal side bars 10. The side bar 10 and brace 13 are angled inwardly from its point of connection with the upright 9 to its inner end to provide a clearance for the brush 19, which brush provides a cylindrical body carrying a spirally arranged series of spaced wire tuft brushes or bristles 20, the said spiral series being so arranged that on rotation of the brush the cotton plant engaged thereby will be drawn inwardly of the machine and over the trough 6, while at the same time being agitated by the action of the wire tufts.

Adjustment of the handles 1 and trough 6 relative to the brush 19 is obtained by means of a nut 21 disposed over a projecting end of the cross bar 3, whereby, as the nut is loosened, the handles of the trough may be raised or lowered relative to the brush and when in the desired position, on tightening of the nut 21, the handles will be clamped in position as desired.

The disposition of the brush 19 is such that it will be disposed directly over the trough 6, which may contain a quantity of a suitable insecticide, preferably coal oil, to destroy insects dropped therein.

Secured to the longitudinal side bar 10, and in advance of its point of connection with the upright 9, is a laterally extending upright bow 22 of sufficient height to clear the cotton plant passed thereunder and carrying at its outer end a rearwardly and inwardly extending guide 23. The guide 23 extends at its rear end inwardly of the machine and over the trough 6, terminating in substantial alignment with the brush 19 and considerably in the rear thereof. The bow 22 is vertically adjustable through the clamp 33 on the side bar 10 by screw 32 whereby the bow may be raised and lowered to the desired position and the guide 23 is adjustable relative to the bow 22, by a suitable clamping nut 24 disposed at its point of connection with the end of the bow, whereby the rear end of the guide may be raised and lowered when desired.

The guide 23 carries, adjacent its rear end, a spur shaft 25 projecting inwardly of the machine and carrying a rotatable brush 26 similar to the brush 19 and connected therewith by means of the universal joint connection 27, whereby rotation of the brush 19 will be imparted to the brush 26 for a purpose to be described.

In operation, the machine is propelled by hand along one side of a cotton row, in such close proximity thereto that the cotton stalks will be passed beneath the bow 22. The guide 23, by reason of its inclined disposition, will gently engage the cotton stalks and exert a firm pressure to bend the same inwardly of the machine and dispose the cotton plant over the trough 6. As the cotton plant is bent over the trough, and not until this is accomplished, it will be engaged by the bristles 20 of the brush 19, and, due to the spiral arrangement of these bristles, the plant will be drawn within the machine and further over the trough while at the same time being agitated by the rotating action of the bristles. This agitating motion will effectually dislodge the boll weevils and loose squares on the plant which will be dropped into the trough 6. The supplemental brush 26 cooperates with the brush 19 in that it engages a portion of the cotton plant to act as conveyor forcing the same inwardly of the machine and over the trough. However, in practice, the supplemental brush 26, shaft 25, and connection 27 may be dispensed with as they do not constitute essential elements of the invention. The inner end of the frame consisting of the longitudinal side bars 10 is in connection with the handles 1 by means of a vertically disposed strap bar 28 provided with a vertically arranged series of bolt holes 29 adapted to receive the bolt 30 engaged in a cross bar 31 extending between the handles. By this construction the inner end of the frame may be raised or lowered relative to the trough and handles and secured in the desired position by a disposition of the bolt 30 in the desired bolt hole 29 of the strap 28.

This machine is designed to be used on the cotton plant in its early stages of growth and before it has attained any considerable height. The action of the machine is such that the cotton stalk will be gently engaged and drawn inwardly so that the plant itself will be disposed over the receiving trough before any appreciable agitation thereof takes place. With the machines hitherto employed in this art, the agitating action has generally resulted in the cotton boll weevil dropping to the ground between the usual side troughs employed, which will defeat the object sought to be attained. With the present device, the escape of the boll weevil and dropping of loose squares upon the ground is absolutely prevented as no agitation of the stalk or plant itself is permitted to take place until the same is disposed directly over the receiving trough.

While I have illustrated and described certain details entering into the construction and operation of the machine, I desire it to be understood that the invention is not to be limited to such, but that any changes and modifications may be made in the details of the construction as will fall within the scope of the invention as claimed.

I claim:

1. A machine of the character described comprising a movable receptacle, a rotary agitator disposed entirely over said receptacle and rotatable in the direction of movement of said receptacle, and a lateral guide member engageable with a cotton plant to bend the same over the receptacle and into engagement with the agitator.

2. A machine of the character described comprising a movable receptacle, a rotary agitator disposed entirely over said receptacle and rotatable in the direction of movement of said receptacle, a lateral guide member engageable with a cotton plant to bend the same over the receptacle and into engagement with the agitator, and means on said agitator to draw the cotton plant further over the receptacle upon engagement therewith.

3. A machine of the character described comprising a movable receptacle, an upwardly extending wall at one side thereof, a rotary agitator disposed over said receptacle and rotatable in the direction of movement of the same, a lateral guide member disposed adjacent the open side of the receptacle adapted to engage and bend a cotton plant over the receptacle into engagement with the agitator, and means on said agitator to draw the cotton plant further over the receptacle in the direction of the closed wall thereof.

4. A machine of the character described, comprising a wheeled frame, a receptacle in said frame, a rotatable agitator disposed in said frame over said receptacle, a laterally projecting inwardly inclined guide carried by said frame and adapted to engage a cotton stalk to draw said stalk inwardly over said receptacle, and means on said agitator to engage a cotton plant when drawn inwardly by said guide member to agitate said cotton plant while at the same time drawing said plant further within the machine over said receptacle.

5. A machine of the character described comprising a frame, a traction wheel mounted in one end thereof, a spiral rotary brush carried by the other end, driving connections between said wheel and brush, handle bars extending rearwardly from said frame between said wheel and brush, a receptacle depending from one of said bars and adapted to be positioned below the brush, and a laterally inwardly extending guide carried by said frame.

6. A machine of the character described comprising a movable receptacle, an agitator disposed over said receptacle, a lateral guide member to bend a cotton plant over said receptacle, and positively driven feed means on said guide to supplement the action of the same.

7. A machine of the character described comprising a movable receptacle, an agitator disposed over said receptacle, and positively driven means laterally disposed with respect to the receptacle to bend a cotton plant over the receptacle into engagement with the agitator.

8. A machine of the character described comprising a movable receptacle, an agitator disposed entirely thereover and movable in the direction of said receptacle, and separate positively driven feed means laterally disposed with respect to the receptacle to bend a cotton plant into engagement with the agitator.

In testimony whereof I affix my signature.

RHESA F. KENNEDY.